E. G. GILSON.
BEARING MATERIAL SUITABLE FOR INTERNAL COMBUSTION ENGINES.
APPLICATION FILED JULY 3, 1914.

1,177,407.

Patented Mar. 28, 1916.

Witnesses:

Inventor:
Emery G. Gilson,
by
His Attorney.

UNITED STATES PATENT OFFICE.

EMERY G. GILSON, OF SCHENECTADY, NEW YORK, ASSIGNOR TO GENERAL ELECTRIC COMPANY, A CORPORATION OF NEW YORK.

BEARING MATERIAL SUITABLE FOR INTERNAL-COMBUSTION ENGINES.

1,177,407. Specification of Letters Patent. Patented Mar. 28, 1916.

Application filed July 3, 1914. Serial No. 848,874.

*To all whom it may concern:*

Be it known that I, EMERY G. GILSON, a citizen of the United States, residing at Schenectady, county of Schenectady, State of New York, have invented certain new and useful Improvements in Bearing Material Suitable for Internal-Combustion Engines, of which the following is a specification.

The present invention relates to bearing materials and comprises a coherent, spongy or porous body of metal having finely divided carbonaceous material, preferably graphite, distributed throughout its mass. The bearing material, comprising my invention in its broadest aspect, is particularly applicable to internal combustion engines of the slide valve type. The term "slide valve" is here used in its generic sense as including any type of internal combustion engine having contacting valve surfaces which slide one over the other, and is intended to cover all such engines whether sliding movement be a reciprocating motion or a rotary or oscillatory motion. It is required that such valves be sufficiently tight to hold the cylinder pressure on the compression stroke and the firing pressure, and that they be well lubricated so as not to be subject to excessive wear. It is also of primary importance that the valves be so designed that they will not warp or distort. There are certain designs of this type of engine which, while they have been successful in every other respect, have failed due to the fact that the valves run excessively hot, the temperatures reaching as high as 300° and 400° centigrade,—temperatures at which ordinary bearing surfaces and lubricating means are wholly ineffectual—and prior to my present invention this design of engine had been considered an impossibility owing to the lack of a suitable bearing material for the bearing surfaces and a means for lubricating them.

By using a self-lubricating bearing material, as hereinafter fully described, the problem of a valve which may be run at such a high temperature that upon its face it seems impossible, is actually solved.

Figure 1:
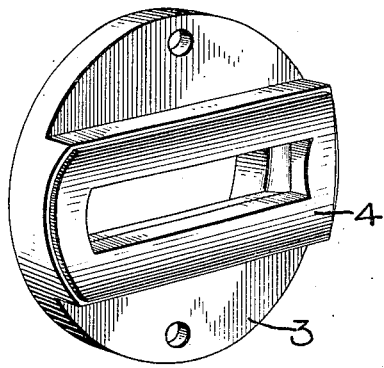
Figure 2:
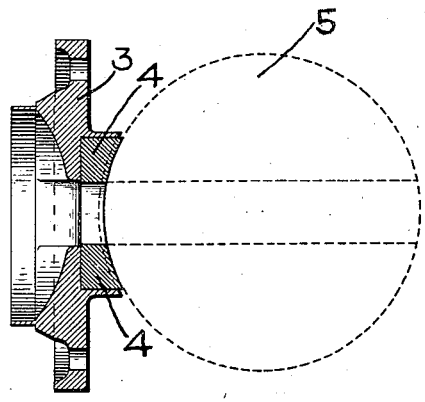

Referring to the drawing, Figure 1 is a perspective view of a member carrying a valve seat according to the present invention, and Fig. 2 is a section thereof with the valve properly shown in dotted lines.

3 indicates a holding member having pressed thereinto the bushing 4 which has a curved surface for the valve 5. This bushing is formed of the self lubricating material hereinafter described as forming the subject matter of the present invention. It will be understood, of course, that this drawing is only by way of example, and that the bearing material may be used in any desired manner in effecting the objects of my invention.

In carrying out my invention I use a self-lubricating material formed of a suitable metallic substance having carbon in a finely divided state distributed throughout its mass. As the metallic substance I preferably use copper or copper alloyed with suitable metals used in the graphitic form.

The material may be manufactured by any desired or approved process. I have obtained very satisfactory results by the following process, however, and at the present time prefer the same. According to this preferred process an intimate mixture of graphite and a suitable metallic compound or compounds, for example metallic oxids, is heated to a temperature sufficient to reduce all but a small percentage of the oxids by interaction with some of the graphite. The reduction mass, still containing a certain percentage of unreduced material, is then compressed under relatively heavy pressure into desired form and the reduction is continued after compression until it is substantially complete and consolidation of the metals has taken place. The presence of unreduced material in the mixture before compression appears to prevent both segregation and agglomeration of the metal powder and results in a homogeneous coherent product in which the graphite is distributed with great uniformity.

I preferably use an alloy of copper, tin and lead, and to this end I may prepare the material from black copper oxid, tin oxid and lead oxid. Suitable proportions of these materials, together with the graphite, are first finely pulverized and thoroughly mixed. For this purpose they can conveniently be pulverized in a ball mill. This mixture is placed in a suitable retort consisting, for example, of copper, and is heated for about three hours to a temperature of about 600° C., or somewhat higher. At the end of this time a part of the metals will have been reduced by the graphite to a metallic state, but the mixture should contain small amounts of unreduced oxids.

Upon cooling the mixture is put through a one hundred mesh sieve and is compressed into desired form. The compressed articles are then packed in charcoal so as to exclude air, and are again heated to a temperature of about 600° C., or somewhat higher, until the reduction of the metals is substantially complete and alloyage between the copper, tin, and lead has taken place. As the metal articles when fired preserve their desired form and are porous the metals may be said to be sintered, that is the higher melting components may be cemented by the components of lower melting point, as distinguished from complete fusion at a higher temperature. To obtain these results it is advisable to regulate the heat and the duration of heating so as to reach the above temperature at the end of about eighteen hours, the heating being then continued for sixty hours or longer. At the present time I prefer to use such a mixture that the final product will consist of approximately 73% Cu.; 13% Sn.; 10% Pb., and 4% graphite.

Material made by the above process is more or less porous and is capable of being impregnated with some other material, and I may take advantage of this fact in forming my bearing and impregnate it with a suitable substance for improving the lubricating qualities of the material. I find that the material will retain as high as 5% by weight of lubricating oil and I may accordingly impregnate the material with oil. I have also found that paraffin and vaseline give very good results and I may accordingly use these substances. I may also use a fine powder, as for example, magnesia, talc or chalk with beneficial results.

A bearing material, such as I have described, is softer than either bronze or Babbitt bearing metals and the metals therein oxidize quite readily. For these reasons it would appear on its face that this material would not be well suited for this particular use. Particularly is this true when it is considered that the bearing is run at a temperature very close to the melting point of the material. It has been found by experiment and actual tests, however, that a bearing formed of this material holds up satisfactorily under these extreme operating conditions. I have found that engines equipped with valve bearings of this material, after having been subjected to most rigid tests, show no appreciable wear on the bearings and that they become polished to a very smooth glassy surface and in turn polish the valves themselves, and that although fitting tight there is a very little friction.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination in an internal combustion engine of the slide valve type, of a valve mechanism designed to run at high temperatures having a self-lubricating bearing surface formed of a porous, soft metal alloy having finely divided carbon distributed throughout its mass, the metal being largely in excess of the carbon.

2. A self lubricating bearing material for the valve seats of internal combustion engines of the type having slide valves which are designed to run at high temperatures, comprising an alloy of copper with softer metals and having finely divided graphite distributed through its mass, the proportion of alloy being largely in excess of the graphite.

3. A self-lubricating bearing material comprising an alloy of copper, tin and lead consolidated to a coherent, porous mass at a temperature materially below the melting point of copper and having finely divided graphite distributed throughout said mass, the alloy being materially in excess of the graphite.

4. The combination in an internal combustion engine of the slide valve type, of a valve mechanism designed to run at high temperatures having a self lubricating bearing formed of an alloy of copper, tin and lead having finely divided graphite distributed throughout its mass, the alloy being in excess of the graphite.

5. The combination in an internal combustion engine of the slide valve type, of a valve mechanism designed to run at high temperatures having a self lubricating bearing formed of a material comprising a metallic substance having finely divided carbon distributed throughout its mass and impregnated with a lubricating substance.

6. The combination in an internal combustion engine of the slide valve type, of a valve mechanism designed to run at high temperatures having a self lubricating bearing formed of copper having finely divided carbon distributed throughout its mass and impregnated with a lubricating substance.

7. A self lubricating bearing material for the valve seats of internal combustion engines of the type having slide valves which are designed to run at high temperatures, comprising a metallic substance having finely divided graphite distributed throughout its mass, and impregnated with a substance for improving its lubricating qualities.

8. A self lubricating bearing material for the valve seats of internal combustion engines of the type having slide valves which are designed to run at high temperatures, comprising an alloy of copper with one or more other metals having finely divided graphite distributed throughout its mass, and impregnated with a substance for improving its lubricating qualities.

9. A self-lubricating bearing material comprising a metal structure containing about 73 parts copper, about 13 parts tin and about 10 parts lead, and finely divided graphitic material distributed throughout said mass, the alloy preponderating over said material.

10. A self lubricating bearing material, comprising an alloy of copper, tin and lead in the proportion of approximately seventy-three parts of copper, thirteen parts of tin, and ten parts of lead having finely divided graphite distributed throughout its mass, and impregnated with a lubricating substance.

11. The combination in an internal combustion engine of the slide valve type, of a valve mechanism designed to run at high temperatures having a self lubricating bearing formed of copper alloyed with tin and lead having finely divided graphite distributed throughout its mass, and impregnated with a substance for improving its lubricating qualities.

12. The combination in an internal combustion engine of the slide valve type, of a valve mechanism designed to run at high temperatures having a self lubricating bearing formed of an alloy of copper, tin and lead having finely divided graphite distributed throughout its mass, the proportions being substantially seventy-three per cent. copper, thirteen per cent. tin, ten per cent. lead, and four per cent. graphite.

In witness whereof, I have hereunto set my hand this 2nd day of July, 1914.

EMERY G. GILSON.

Witnesses:
BENJAMIN B. HULL,
MARGARET E. WOOLLEY.

---

It is hereby certified that in Letters Patent No. 1,177,407, granted March 28, 1916, upon the application of Emery G. Gilson, of Schenectady, New York, for an improvement in "Bearing Material Suitable for Internal-Combustion Engines," an error appears in the printed specification requiring correction as follows: Page 1, line 72, after the word "metals" insert the words and period *as lead and tin. The carbon is preferably;* and that the said Letters Patent should be read with this correction therein that the same may conform to the record of the case in the Patent Office.

Signed and sealed this 25th day of April, A. D., 1916.

[SEAL.]

J. T. NEWTON,
*Acting Commissioner of Patents.*

Cl. 64—19.